United States Patent [19]
Takada

[11] Patent Number: 6,000,451
[45] Date of Patent: Dec. 14, 1999

[54] PNEUMATIC TIRE INCLUDING AT LEAST ONE PROJECTION

[75] Inventor: Yoshiyuki Takada, Kobe, Japan

[73] Assignee: Sumitomo Rubber Industries, Ltd., Hyogo-ken, Japan

[21] Appl. No.: 08/896,808

[22] Filed: Jul. 18, 1997

[30] Foreign Application Priority Data

Jul. 19, 1996 [JP] Japan ..................................... 8-190818
Sep. 5, 1996 [JP] Japan ..................................... 8-235482

[51] Int. Cl.$^6$ .............................. B60C 11/11; B60C 11/13
[52] U.S. Cl. ................................ 152/209.19; 152/209.26; 152/902; 152/DIG. 1
[58] Field of Search .......................... 152/209 R, 209 D, 152/DIG. 1, 209.18, 209.19, 209.23, 209.26, 902

[56] References Cited

U.S. PATENT DOCUMENTS

| | | | |
|---|---|---|---|
| 2,604,920 | 7/1952 | Kirby | 152/209 R |
| 4,345,632 | 8/1982 | Takigawa et al. | 152/209 R |
| 4,945,966 | 8/1990 | Ogawa | 152/209 R |
| 5,024,260 | 6/1991 | Ochiai | 152/209 F |
| 5,160,385 | 11/1992 | Goto et al. | 152/209 R |
| 5,180,453 | 1/1993 | Fukasawa et al. | 152/209 R |
| 5,361,815 | 11/1994 | Loser et al. | 152/209 R |
| 5,417,269 | 5/1995 | Kinoshita et al. | 152/209 R |

FOREIGN PATENT DOCUMENTS

| | | | |
|---|---|---|---|
| 3727050 | 2/1989 | Germany | 152/209 R |
| 63-297108 | 12/1988 | Japan | 152/209 R |
| 2-254004 | 10/1990 | Japan | 152/209 R |
| 3-132403 | 6/1991 | Japan | 152/209 R |
| 5-278414 | 10/1993 | Japan | 152/209 R |
| 6-99705 | 4/1994 | Japan | 152/209 R |

*Primary Examiner*—Steven D. Maki

[57] ABSTRACT

A pneumatic tire having a block type tread pattern improved in stone trapping, which comprises the tread portion provided with a mesh of grooves to define blocks, each block surrounded by at least one projection standing out from the groove bottom leaving spaces from the groove walls, the projection comprising alternate wide main portions and narrow coupler portions, the height of the wide main portions being in the range of from 10 to 25% of the groove depth, the height of the narrow coupler portions being not less than 5% but less than 10% of the groove depth, the length of each of the wide main portions being in the range of from 3 mm to 10 mm, the length of each of the narrow coupler portions being in the range of from 2 mm to 5 mm, and the width of the narrow coupler portions being in the range of from 1 mm to 2 mm.

15 Claims, 8 Drawing Sheets

VII A - VII A'

Fig. 7 (a)

VII B - VII B'

PNEUMATIC TIRE INCLUDING AT LEAST ONE PROJECTION

BACKGROUND OF THE INVENTION

The present invention relates to a pneumatic tire having projections standing out from the bottom of grooves in the tire tread to prevent stones from being trapped therein.

In vehicles which travel on dirt roads such as trucks, construction vehicles and the like, small foreign objects such as stones, pebbles and the like are liable to be trapped in the tread grooves on the tires of the vehicles.

While travelling, the trapped stones are repeatedly pressed against the groove walls and groove bottom. As a result, the groove bottom and the structure inside the tire (such as reinforcing cord layers) are often damaged seriously. Therefore, not only the durability of the tread portion but also the retread rate of the used tires decreases.

In order to avoid stone trapping, many ideas have been proposed. For example, in the laid-open Japanese patent application Nos. JP-A-60-189608 and JP-A-61-291203, a tire having a rib type tread pattern is disclosed, wherein a circumferentially and continuously extending zigzag groove is provided therein with circumferentially discontinuous projections. In U.S. Pat. No. 5160385, a tire having of a block type tread pattern is disclosed, wherein circumferentially continuously extending grooves are provided therein with circumferentially discontinuous projections. The circumferential grooves are interconnected by axial grooves, and some of the projections disposed at the junctions of the circumferential grooves and axial grooves have branches which extend into the axial grooves but immediately end.

In general, stone trapping is liable to occur in a central tread region where ground pressure is relatively high. If a block pattern tire is made according to the above-mentioned assumptions, then in the center tread center region, stones are still liable to be trapped in the circumferential groove between the projections and also in the axial grooves. Thus, the tire may be damaged.

SUMMARY OF THE INVENTION

Therefore, an object of the present invention is to provide a pneumatic tire having a block type tread pattern in which stone trapping especially in a central trap region, is effectively decreased so as to prevent the tread rubber and reinforcing cord layers from being damaged and to thereby improve the tread durability and increase the retread rate.

According to one aspect of the present invention, a pneumatic tire includes a tread portion provided with a mesh of grooves defining blocks at least in a central portion of the tread.

Each block is surrounded by at least one projection and each projection is disposed in the mesh of grooves and stands out from the groove bottom, spaced away from the groove walls.

Each projection includes alternate wide main portions and narrow coupler portions.

The height of the wide main portions is in the range of from 10 to 25% of the groove depth.

The height of the narrow coupler portions is at least 5% but less than 10% of the groove depth.

The length of each of the wide main portions is in the range of from 3 mm to 10 mm.

The length of each of the narrow coupler portions is in the range of from 2 mm to 5 mm;

The width of the narrow coupler portions is in the range of from 1 mm to 2 mm.

Preferably, the groove walls include a perpendicular under part in which the groove width is substantially constant and a slanting upper part in which the groove width increases a in direction from the lower end to the upper end thereof. The boundary between the upper and under parts is at a height from the groove bottom, of from 15 to 30% of the groove depth.

DESCRIPTION OF THE PREFERRED EMBODIMENTS

Embodiments of the present invention will now be described in detail, in conjunction with the accompanying drawings.

In the figures., the pneumatic tire 1 according to the present invention is a heavy duty tire for trucks and buses. The tire size is, for example, 11R24.5.

Figure 1:
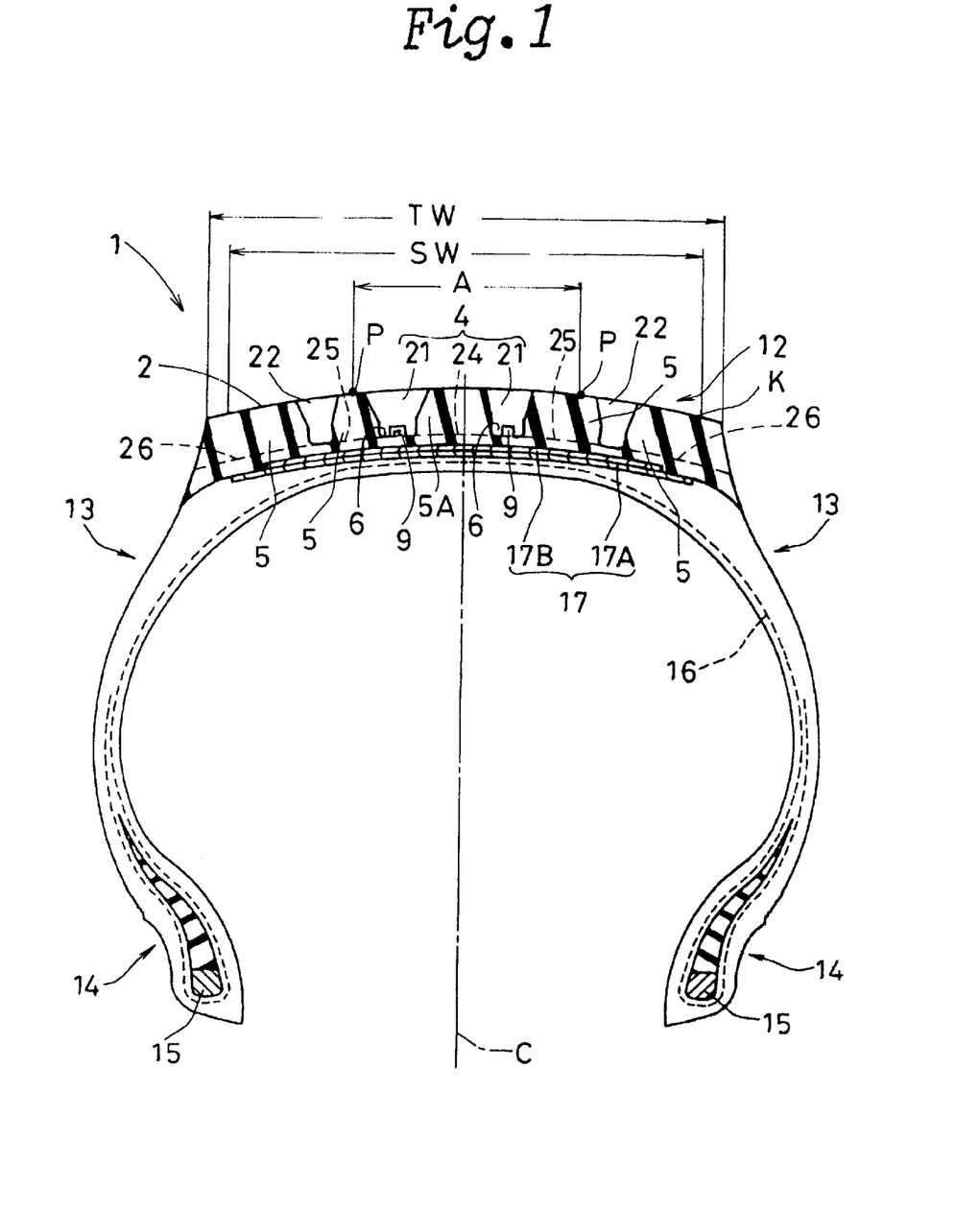
FIG. 1 is a cross sectional view of an embodiment of the present invention.

The tire 1 comprises a tread portion 12, a pair of axially spaced bead portions 14, a pair of sidewall portions 13 extending between the tread edges and the bead portions, a bead core 15 disposed in each of the bead portions 14, a carcass 16 extending between the bead portions 14, and a belt 17 disposed radially outside the carcass 16 and inside a rubber tread.

The carcass 16 comprises one or more carcass plies extending between the bead portions 14, through the tread portion 12 and sidewall portions 13, and turned up around the bead cores 15 in the bead portions 14. Each carcass ply is made of cords arranged radially at an angle of from 90 to 70 degrees with respect to the tire equator C to have a radial or semiradial structure. For the carcass cords, organic fiber cords, e.g. nylon, rayon, aromatic polyamide and the like and steel cords, can be used.

The belt 17 is composed of two to four plies of cords (in this example, two plies 17A, 17B), the cords in each ply being laid crosswise to those of the next ply. For the belt cords, organic fiber cords, e.g. nylon, polyester, rayon, aromatic polyamide and the like and steel cords, can be used.

The tire 1 is provided with a block type tread pattern.

Figure 2:
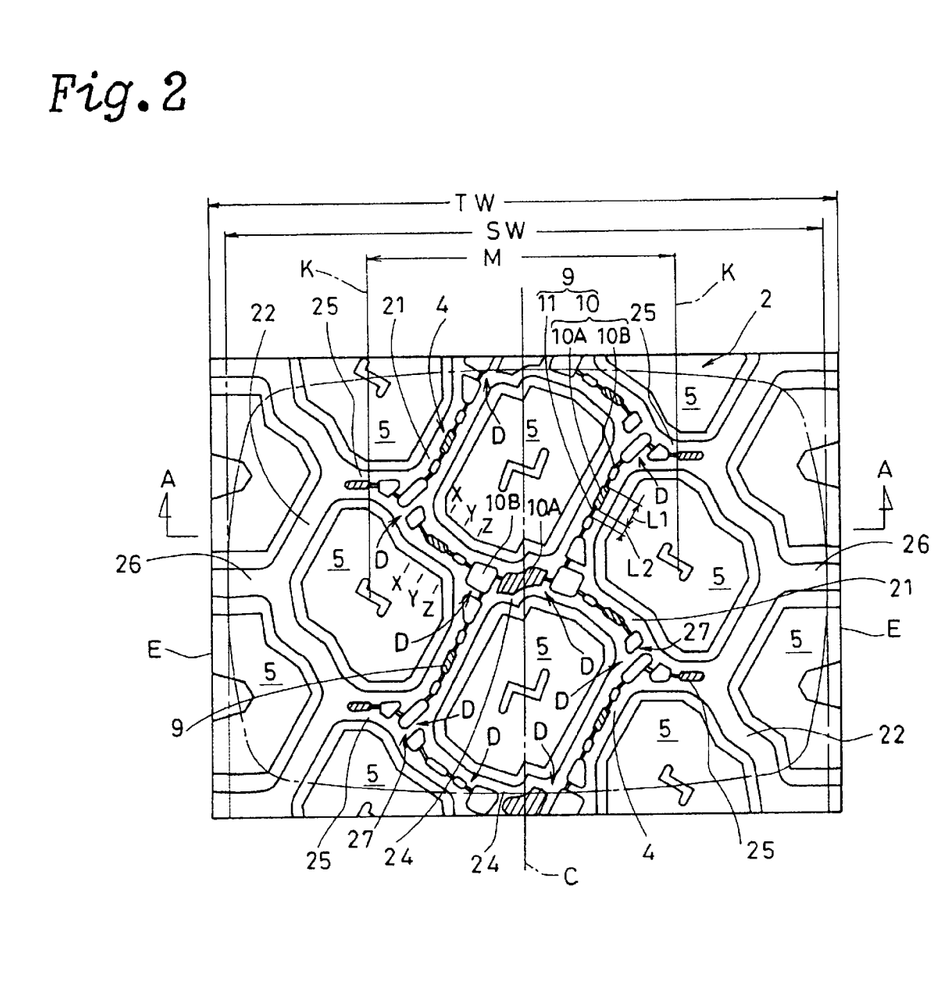
FIG. 2 is a developed plan view showing an example of the tread pattern.
Figure 5:
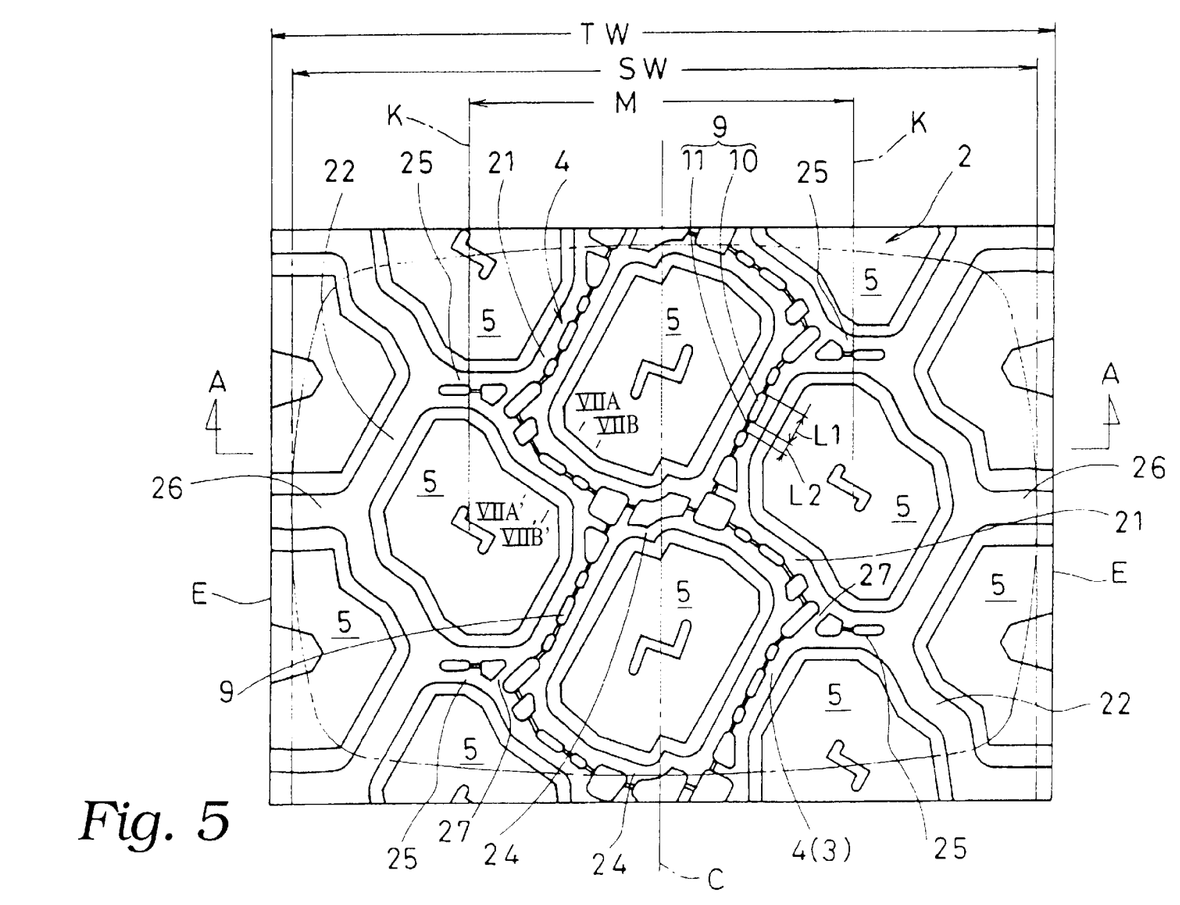
FIG. 5 is a developed plan view showing another example of the tread pattern.

In the examples shown in FIGS. 2 and 5, the tread portion 12 is provided in the tread 2 with four circumferential grooves: a pair of central circumferential grooves 21 each disposed on each side of the tire equator C and extending zigzag in the circumferential direction; and a pair of shoulder circumferential grooves 22 each disposed between each of the central circumferential grooves 21 and the adjacent tread edge E. All the circumferential grooves 21 and 22 are connected by axial grooves. The axial grooves comprise: central axial grooves 24 connecting the central circumferential grooves 21; middle axial grooves 25 connecting the central circumferential grooves 21 with the respective shoulder circumferential grooves 21; and shoulder axial grooves 26 extending from the shoulder circumferential grooves 21 to the tread edge E. As a result, in the tread 2, a mesh of grooves is formed, and there are a plurality of independent blocks 5, 5A defined by the grooves 21, 24, 25 and 26. Hereinafter, these grooves are generically called a main groove 4. Here, the main grooves are defined as having a depth gh (see, for example, FIG. 3) in the range of from 0.08 to 0.18 times the tread width TW, and a top width GW in the range of from 0.06 to 0.15 times the tread width TW. The tread width TW is the axial distance between the tread edges E.

The groove walls 7 of the main groove or the sidewalls of the blocks are each composed of an under part 7A and an upper part 7B.

The upper part 7B extends from the upper end of the under part 7A to the surface of tread 2, slanting so that the groove width increases towards the groove top to promote the ejection of stones and drainage.

The under part 7A projects substantially perpendicularly from the groove bottom 6, whereby stones and the like are prevented from reaching the groove bottom in cooperation with projections 9 (mentioned later).

The height KH of the boundary between the upper and under parts 7A and 7B is in the range of from 15 to 30% of the groove depth GH. If the height KH is less than 15% of the groove depth GH, the corners of the groove bottom 6 are liable to crack when stones become trapped occurs. If the boundary is higher than 30%, water drainage decreases.

In at least the main grooves 4 in a central region M of the tread 2, projections 9 surrounding the central blocks 5 are disposed, the projections 9 standing out from the groove bottom 6 with a predetermined space G from the groove walls 7. The space G is about 2 to 5 mm.

The central tread region M is centered on the tire equator C, the width thereof is 50% of the ground contacting width SW under a standard loaded condition in which the tire is mounted on a standard rim, and inflated to a standard pressure then loaded with a standard load.

The blocks and the main grooves in the central region M are also called a central block and a central main groove for convenience.

Each of the central blocks 5 is surrounded by at least one, and usually two to four, projections 9.

Each projection 9 comprises alternately arranged wide main portions 10 and narrow coupler portions 11. It is not preferable to provide a wide portion extending across the entire width of the groove bottom. Thus, spaced apart by the above-mentioned space G, in the groove bottom 6, a pair of narrow channels are formed on each side of the projection 9. The narrow channels extend continuously along the entire length of the main grooves, which main grooves are provided with the projections.

Each of the wide main portions 10 has a radial height H1 from the groove bottom 6 in the range of from 10 to 25% of the depth GH of the central main grooves 4, and a length L1 in the range of from 3 mm to 10 mm.

Each of the narrow coupler portions 11 has a radial height H2 from the groove bottom 6 being less than 10% but not less than 5% of the groove depth GH, and a length L2 being in the range of from 2 mm to 5 mm, and a width W2 being in the range of from 1 mm to 2 mm.

If the height H1 is less than 10% of the groove depth GH, stone trapping is liable to occur. If the height H1 is more than 25% of the groove depth GH, the resistance of wide main portions 10 against compression decreases, and trapped stones cannot be pushed out of the groove.

If the length L1 is less than 3 mm, the elastic energy of the main portion 10 is insufficient for pushing out trapped stones. If the length L1 is more than 10 mm, the rigidity is excessively increased to decrease the elastic deformation and the function of pushing out trapped stones cannot be obtained.

If the height H2 is less than 5% of the groove depth GH, or the length L2 is more than 5 mm, or the width W2 is less than 1 mm, then the narrow coupler portions 11 decrease in the rigidity and do not adequately function as a coupler between the wide main portions 10. As a result, the pushing-out force of the wide main portions 10 becomes insufficient.

If the height H2 is more than 10% of the groove depth GH, or the length L2 is less than 2 mm, or the width W2 is more than 2 mm, the rigidity difference from the wide main portions 10 is small, and the rigidity of the projections 9 as a whole increases excessively and the pushing-out function can not be obtained.

The junctions of the main grooves, namely, the intersecting points of the mesh, are relatively spacious. Therefore, the wide main portions 10, which are especially large disposed in the junctions. The contour of the large main portion 10 is designed so that the space G between the main portion and the groove wall is maintained at a substantially constant value. The large main portions 10 can be provided at their top surface with a hollow part to adjust the rigidity.

In the example shown in FIG. 2, the above-mentioned wide main portions 10 comprise tall wide main portions 10A of a height H1H (shaded in FIG. 2) and short wide main portions 10B of a height H1L, whereas all the wide main portions 10 in the example shown in FIG. 5 are the same height H1.

Both the heights H1H and H1L are in the range of from 10 to 25% of the groove depth GH as explained above. The difference between the heights H1H and H1L is in the range of from 1.0 to 2.5 mm.

The tall main portions 10A are disposed in the substantially middle position between the junctions D of the main grooves 4. In the other positions, the short wide main portions 10B are disposed. The above-mentioned middle position corresponds to the middle position between two corners of a central block 5A. The rigidity of the block is lower in the corners than the middle position. If stone trapping occurs near the corners, the trapped stone can be ejected by the elastic restoring force of the block corner. In the middle position, by contrast, it is difficult to eject trapped stones relying on the resilient force of the block alone because the elastic deformation is small. Therefore, the tall main portion 10A is disposing in the middle position.

In the examples shown in FIGS. 2 and 5, the projections 9 extend from the central circumferential grooves 21 through the middle axial grooves 25, over the axial edge lines K of the central tread region M to the junctions of the middle axial grooves 25 and the shoulder circumferential grooves 22. The shoulder circumferential grooves 22 and shoulder axial grooves 26 have no projection 9, and thus the groove bottom thereof is substantially flat. However, it is possible to dispose projections all over the tread 2.

Furthermore, it is possible to surround one block by one projection, that is, a closed loop projection. However, in the examples shown in FIGS. 2 and 5, in order to maintain drainage, even if tread wear reaches near the top of the projection, the loop is broken. Thus, one block is surrounded by two or more projections. The broken parts 27 are disposed in the junctions D of the main groove, preferably the junctions between the central circumferential grooves 21 and the middle axial grooves 25. As to the junctions near the tire equator C, broken parts are provided in the example shown in FIG. 2, but it is not always necessary as shown in FIG. 5. Each broken part 27 is formed by omitting one narrow coupler portion 11. Accordingly, it is formed between the wide main portions 10 and the gap therebetween corresponds to the length L2. When the broken parts 27 are formed, the number of the wide main portions 10 and the number of the narrow coupler portions 11 per one projection are at least three and two, respectively. In particular, there is no upper limit for those numbers.

Comparison Test

Test tires of size 11R24.5 having the structure shown in FIG. 1 were made and tested. In the tests, the tires were mounted on the driving wheels of a timber carrier and run for 50000 km. The ratio of on road and off road during was 50:50. Then, the tires were inspected for stone trapping and belt damage.

The specifications of the tires and the test results are shown in Table 1.

TABLE 1

Figure 3:
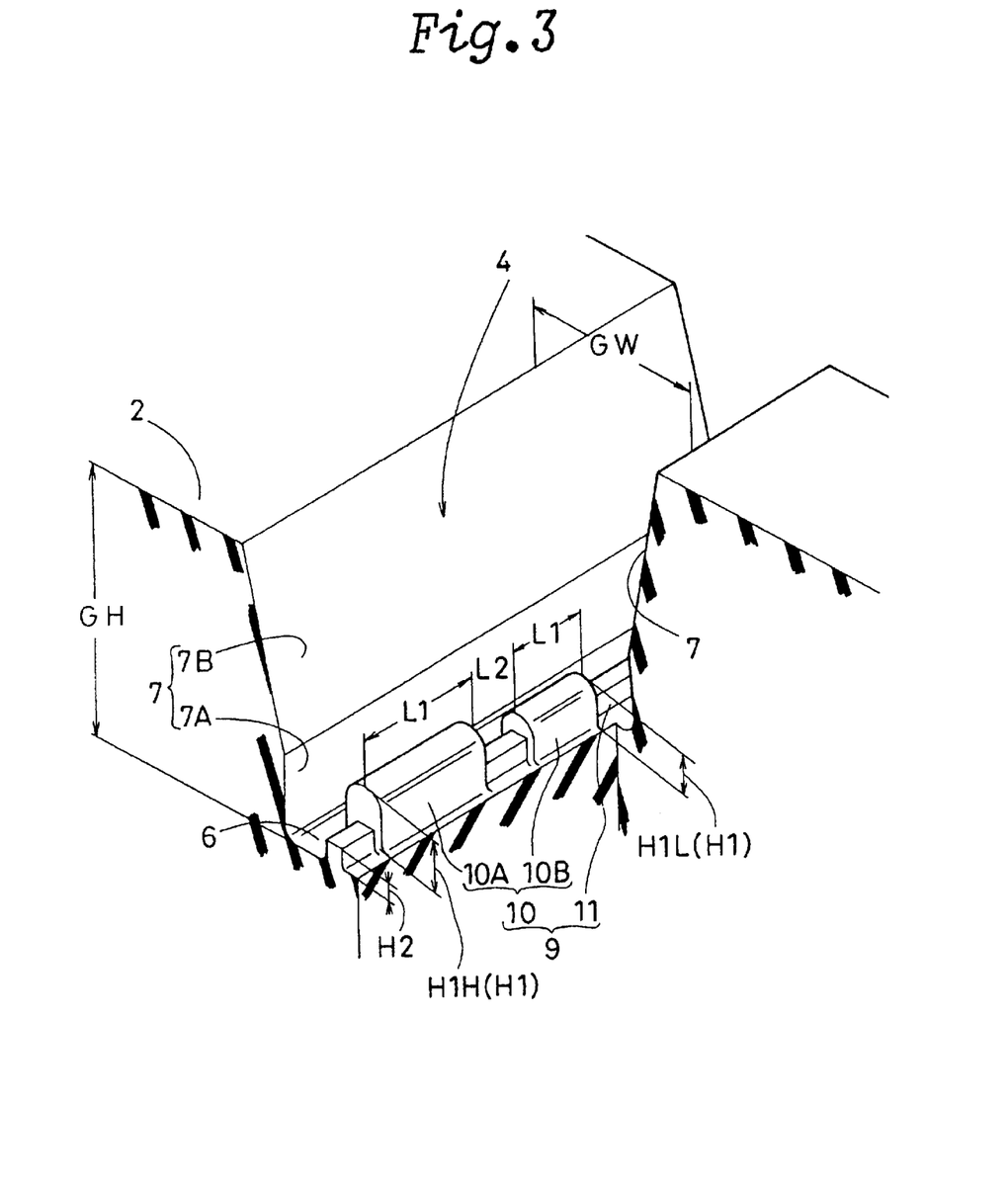
FIG. 3 is an enlarged perspective view of an example of the projection.
Figure 4:
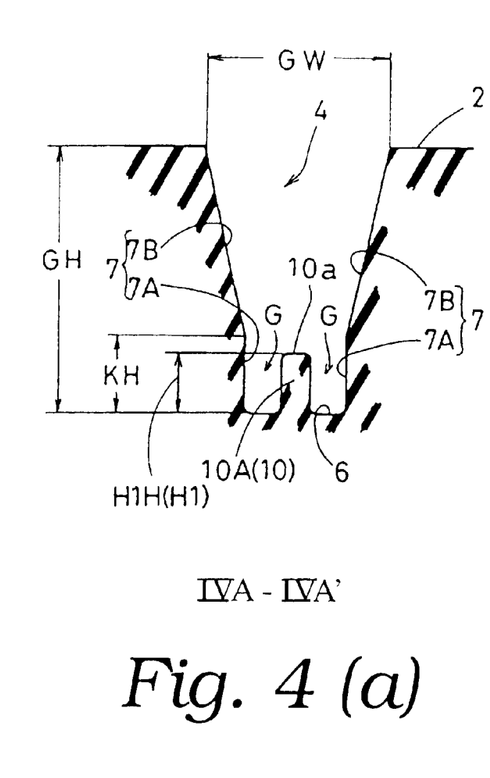
FIG. 4(a), 4(b), 4(c) are cross sectional views of a projection taken from a tall wide main portion, short wide main portion and narrow coupler portion, respectively.
Figure 6:
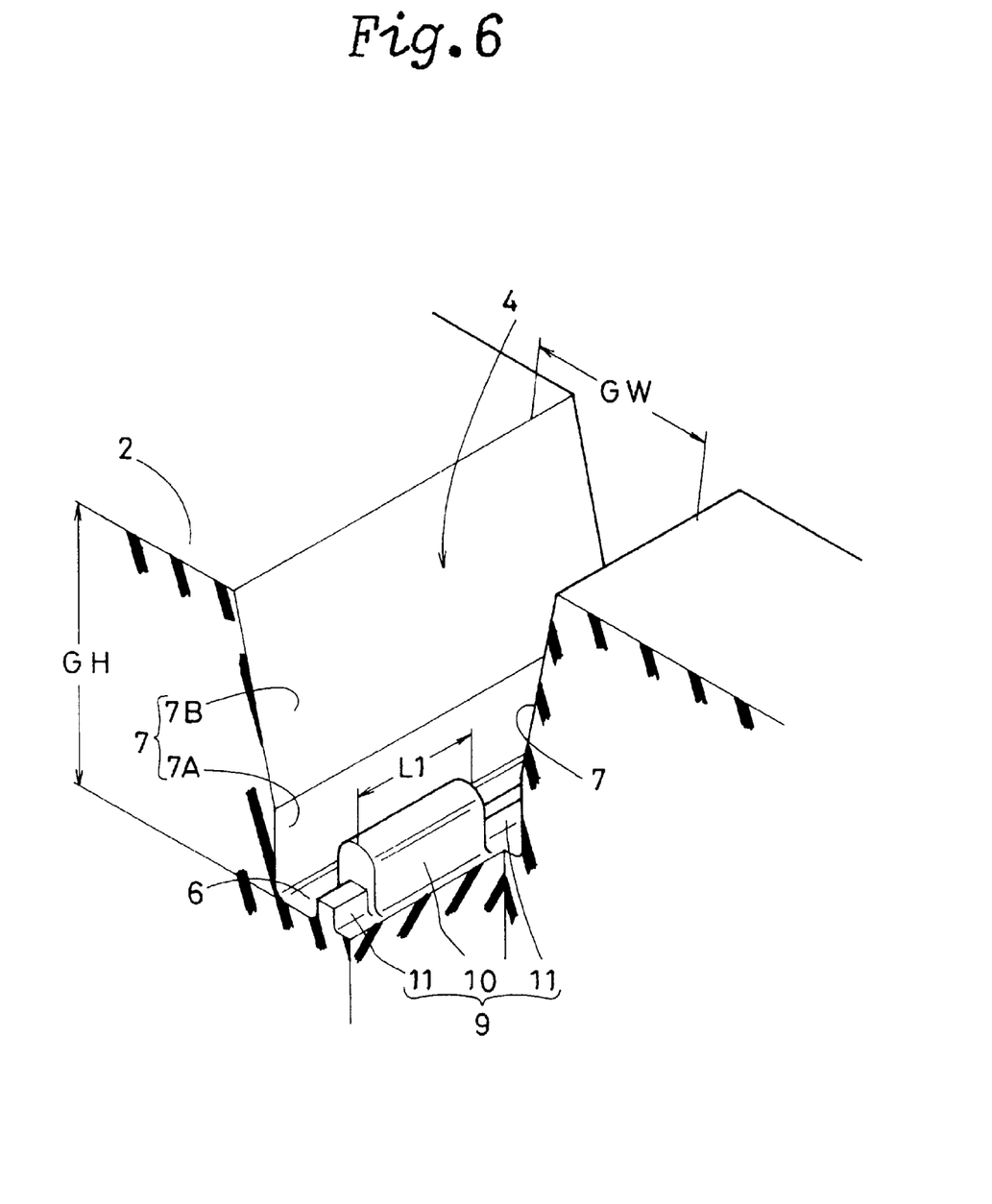
FIG. 6 is an enlarged perspective view of another example of the projection used in the tread pattern shown in FIG. 5.
Figure 7:
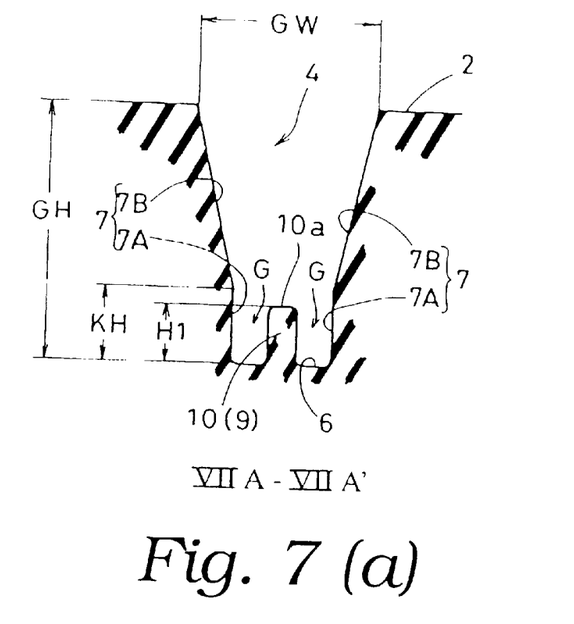
FIG. 7(a), 7(b) are cross sectional views of the projection shown in FIG. 6 taken from a wide main portion and narrow coupler portion, respectively.
Figure 8:
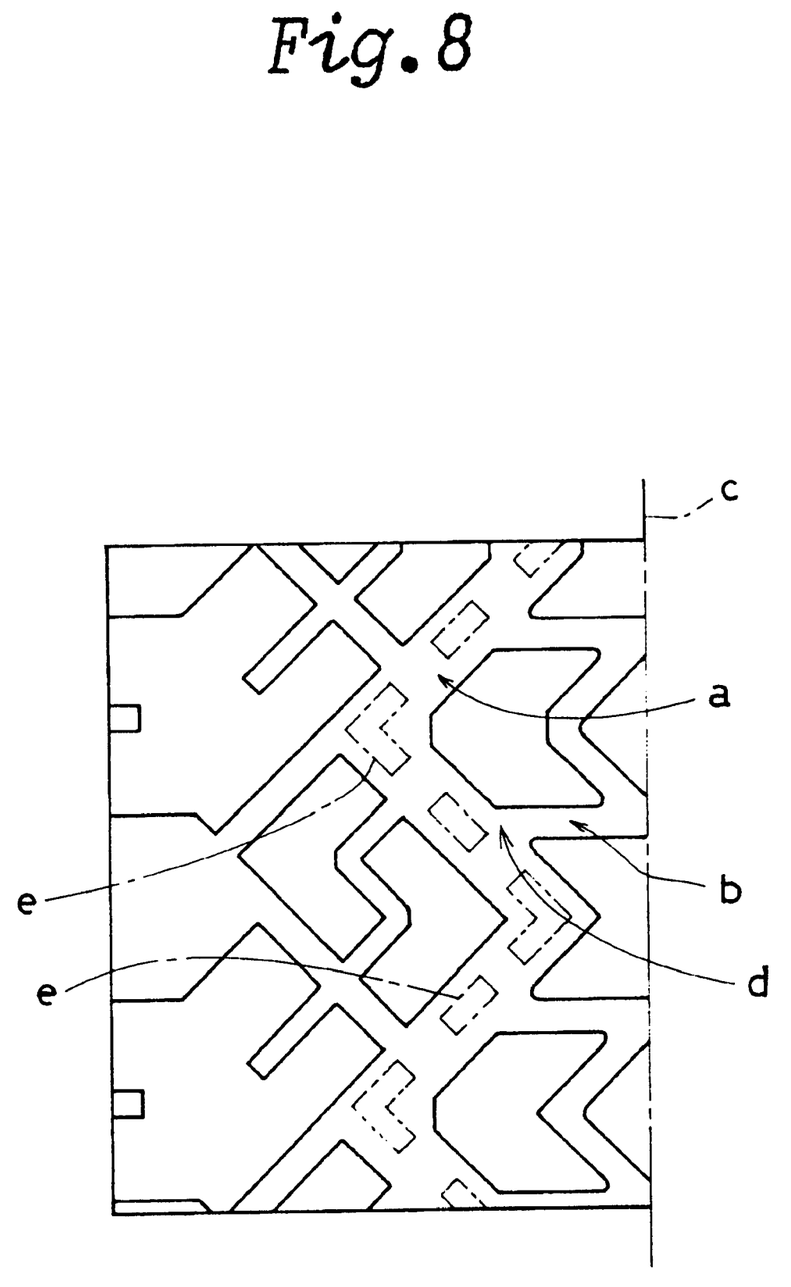
FIG. 8 shows a tread pattern used in comparison tests.

| Tire | Ex.1 | Ex.2 | Ex.3 | Ref.1 | Con |
|---|---|---|---|---|---|
| Treak pattern | FIG. 2 | FIG. 5 | FIG. 5 | FIG. 2 | FIG. 8 |
| Projection | FIG. 3 | FIG. 6 | FIG. 6 | FIG. 6 | non |
| H1 (mm) |  | 4 | 4 | 4 |  |
| H1H | 6 |  |  |  |  |
| H1L | 4 |  |  |  |  |
| H2 (mm) | 2 | 2 | 2 | 2 |  |
| Groove wall inclination | double | single | double | single | single |
| Test results |  |  |  |  |  |
| Trapped stones | 4 | 12 | 4 | 10 | 38 |
| Belt cuts |  |  |  |  |  |
| average | 3 | 6 | 3 | 8 | 42 |
| maximum | 4 | 10 | 4 | 14 | 46 |
| Retread rate | 15/16 | 13/16 | 15/16 | 13/16 | 2/16 |

From the test results, it was confirmed that the tires according to the present invention can be improved in the stone trapping and thus the retread rate and belt cut are improved.

As explained above, in a pneumatic tire according to the present invention, almost all the projections 9 are continuous. Therefore, if stones enter the main grooves, the stones are prevented from reaching the bottom of the main grooves. While driving, the tire is deformed at the ground contacting part, and the projections are also deformed. As a result, the wide main portions display a complex movement because the wide main portions are repeatedly compressed by trapped stones and pulled and pushed by the next wide main portions by way of the narrow coupler portions. Therefore, even if stones are once trapped in the groove, stones are loosened by the above-mentioned complex movement and finally ejected by the projection. However, if the projection is formed in the same cross sectional shape along the entire length thereof like a small rib, trapped stones hindered form reaching to the bottom, but once stones are trapped in the groove, they are liable to be trapped tightly because the above-mentioned complex movement can not be obtained by the uniform rib-like projection.

I claim:

1. A pneumatic tire comprising:
    a tread portion with a block tread pattern, wherein said tread portion is provided with a mesh of grooves to define a plurality of blocks at least in a central portion of said tread portion,
    each said block being surrounded by at least one projection,
    said at least one projection being disposed in said mesh of grooves and projecting from a bottom of said grooves and being spaced from the groove walls,
    each said at least one projection comprising a continuous series of alternating main portions and coupler portions, said main portions being relatively wider than said coupler portions,
    a height H1 of said main portions being in the range of from 10 to 25% of a depth GH of one of said grooves,
    a height H2 of said coupler portions being not less than 5% but less than 10% of the groove depth GH,
    a length L1 of each of said main portions being in the range of from 3 mm to 10 mm,
    a length L2 of each of said coupler portions being in the range of from 2 mm to 5 mm, and
    a width W2 of said coupler portions being in the range of from 1 mm to 2 mm, wherein said main portions comprise first main portions and second main portions, said first main portions being disposed between junctions of said grooves and being relatively taller than said second main portions.

2. A pneumatic tire according to claim 1, wherein said groove walls comprise a perpendicular under part in which a width between said groove walls is substantially constant and a slanting upper part in which said width between said groove walls increases from the lower end to the upper end of said grooves, and
    a boundary between said upper and under parts is at a height KH from said bottom of said grooves, of from 15 to 30% of the groove depth GH.

3. A pneumatic tire according to claim 2, wherein the groove depth GH is in the range of from 0.08 to 0.18 times the tread width TW, and
    the groove width GW at a groove top of one of said grooves is in the range of from 0.06 to 0.15 times the tread width TW.

4. A pneumatic tire according to claim 1, wherein
    a depth GH one of said grooves is in the range of from 0.08 to 0.18 times a tread width TW, and
    a width GW of one of said grooves at a groove top of one of said grooves is in the range of from 0.06 to 0.15 time times said tread width TW.

5. The pneumatic tire according to claim 1, wherein a difference in height between said first main portions and said second main portions is from 1.0 mm to 2.5 mm.

6. The pneumatic tire according to claim 1, wherein said length of each said coupler portions is shorter than said length of each said second main portions.

7. A pneumatic tire comprising:
    a tread portion provided with a mesh of grooves to define blocks constituting a block tread pattern,
    the grooves having a depth in the range of from 0.08 to 0.18 times the tread width and a groove top width in the range of from 0.06 to 0.15 times the tread width, the grooves, in at least a central portion of the tread which is defined as having a width of 50% of the tread width, provided therein with projections, the projections standing out from the groove bottom leaving spaces from the groove walls, each of the projections composed of alternate main portions and coupler portions, the numbers of which are at least three and two, respectively, said main portions being relatively wider than said coupler portions, a height H1 of said main portions being in the range of from 10 to 25% of a depth GH of one of said grooves, a height H2 of said coupler portions being not less than 5% but less than 10% of the groove depth GH, a length L1 of each of said main portions being in the range of from 3 mm to 10 mm, a length L2 of each of said coupler portions being in the range of from 2 mm to 5 mm, and a width W2 of said coupler portions being in the range of from 1 mm to 2 mm, wherein said main portions comprise first main portions and second main portions, said first main portions being disposed between junctions of said grooves and being relatively taller than said second main portions.

8. A pneumatic tire according to claim 7, wherein the projections include closed-loop projections each surrounding one of the blocks.

9. A pneumatic tire according to claim 8, wherein said groove walls comprise a perpendicular under part in which the groove width is substantially constant and a slanting upper part in which the groove width increases from the lower end to the upper end thereof, and the boundary between the upper and under parts is at a height KH, from the groove bottom, of from 15 to 30% of the groove depth GH.

10. A pneumatic tire according to claim 7, wherein the projections include substantially closed-loop projections each surrounding one of the blocks, each said substantially closed-loop projection is provided with one to four broken parts each formed by omitting one coupler portion, whereby the broken part is formed between said main portions and the gap thereof is in the range of from 2 mm to 5 mm.

11. A pneumatic tire according to claim 10, wherein the number of said one to four broken parts is two.

12. A pneumatic tire according to claim 11, wherein said groove walls comprise a perpendicular under part in which the groove width is substantially constant and a slanting upper part in which the groove width increases from the lower end to the upper end thereof, and the boundary between the upper and under parts is at a height KH, from the groove bottom, of from 15 to 30% of the groove depth GH.

13. A pneumatic tire according to claim 10, wherein said groove walls comprise a perpendicular under part in which the groove width is substantially constant and a slanting upper part in which the groove width increases from the lower end to the upper end thereof, and the boundary between the upper and under parts is at a height KH, from the groove bottom, of from 15 to 30% of the groove depth GH.

14. The pneumatic tire according to claim 7, wherein a difference in height between said first main portions and said second main portions is from 1.0 mm to 2.5 mm.

15. The pneumatic tire according to claim 7, wherein said length of each said coupler portions is shorter than said length of each said second main portions.

* * * * *